US008428029B2

(12) United States Patent
Fox et al.

(10) Patent No.: US 8,428,029 B2
(45) Date of Patent: Apr. 23, 2013

(54) MOBILITY MANAGEMENT IN TELECOMMUNICATION SYSTEMS

(75) Inventors: David Fox, Reading (GB); Christopher David Pudney, Newbury (GB); Timothy Frost, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 460 days.

(21) Appl. No.: 12/311,415

(22) PCT Filed: Oct. 2, 2007

(86) PCT No.: PCT/GB2007/003740
§ 371 (c)(1),
(2), (4) Date: Oct. 14, 2010

(87) PCT Pub. No.: WO2008/040962
PCT Pub. Date: Apr. 10, 2008

(65) Prior Publication Data
US 2011/0026484 A1 Feb. 3, 2011

(30) Foreign Application Priority Data
Oct. 2, 2006 (GB) .................................. 0619409.6

(51) Int. Cl.
*H04Q 7/00* (2006.01)
(52) U.S. Cl.
USPC ............ 370/331; 370/332; 370/342; 455/436
(58) Field of Classification Search .................... 455/436
See application file for complete search history.

(56) References Cited

U.S. PATENT DOCUMENTS 6,230,013 B1 * 5/2001 Wallentin et al. ............. 455/436
6,351,650 B1 2/2002 Lundby et al.
(Continued)

FOREIGN PATENT DOCUMENTS

| EP | 1229754 | 8/2002 |
| WO | WO99/55110 | 10/1999 |
| WO | WO 01/43462 A2 | 6/2001 |

OTHER PUBLICATIONS

3GPP TS 25.304 V7.0.0 (Mar. 2006), Technical Specification, 3rd Generation Partnership Project; Technical Specification Group Radio Access Network; User Equipment (UE) procedures in idle mode and procedures in cell reselection in connected mode (Release 7), 38 pp.

(Continued)

*Primary Examiner* — Duc C Ho
(74) *Attorney, Agent, or Firm* — Muirhead and Saturnelli, LLC

(57) ABSTRACT

A mobile telecommunications network includes a core network and a plurality of eNode Bs. A mobile terminal communicates with the core network via one of the eNode Bs. In an embodiment, when the mobile terminal is in a connected state and there is a pause in data transfer, during which the mobile terminal is handed over from one eNode B to another eNode B, the first eNode B informs the new eNode B of the pause in data transmission so that an optimal length of the pause in data transmission can be maintained before the idle state is entered. In another embodiment, an element of the telecommunications network stores a history of movement of the mobile terminal and passes this to a new eNode B. In another embodiment, when handover occurs, the first eNode B provides the new eNode B with radio quality information relating to the mobile terminal.

20 Claims, 3 Drawing Sheets

U.S. PATENT DOCUMENTS

| | | | | |
|---|---|---|---|---|
| 6,775,255 | B1* | 8/2004 | Roy | 370/331 |
| 7,436,804 | B2* | 10/2008 | O'Neill | 370/331 |
| 7,590,422 | B1* | 9/2009 | Chow et al. | 455/436 |
| 2010/0329214 | A1* | 12/2010 | Chun et al. | 370/331 |

OTHER PUBLICATIONS

3GPP TS 23.236 V6.3.0 (Mar. 2006), Technical Specification, 3rd Generation Partnership Project; Technical Specification Group Services and System Aspects; Intra-domain connection of Radio Access Network (RAN) nodes to multiple Core Network (CN) nodes (Release 6), 37 pp.

3GPP TS 05.08 V8.23.0 (Nov. 2005), Technical Specification, 3rd Generation Partnership Project; Technical Specification Group GSM/EDGE Radio Access Network; Radio subsystem link control (Release 1999), 100 pp.

ETSI TS 125 331 V7.1.0 (Jun. 2006), Technical Specification, Universal Mobile Telecommunications System (UMTS); Radio Resource Control (RRC); Protocol specification (3GPP TS 25.311 version 7.1.0 Release 7), pp. 1-99.

* cited by examiner

1

MOBILITY MANAGEMENT IN TELECOMMUNICATION SYSTEMS

TECHNICAL FIELD

This application relates to mobility management in telecommunication systems, and more particularly, but not exclusively, to a mobile telecommunications system including at least one mobile terminal and a plurality of telecommunications nodes for providing radio resources to the mobile terminal when registered therewith, each node controlling a plurality of cells for communicating with the mobile terminal, in which the mobile terminal is operable to change from registration with a first of the nodes to registration with a second of the nodes.

BACKGROUND TO THE INVENTION

Currently 2G (GSM), 2.5G (GPRS) and 3G (UMTS/UTRA) mobile or cellular telecommunications networks (PLMNs) co-exist. A development of the radio access network part of 3G mobile telecommunications is "evolved" UTRA or E-UTRA, also referred to as LTE (Long Term Evolution). "System Architecture Evolution" (SAE) is the development of the core network part of 3G mobile telecommunications. The combined core network and radio network development is sometimes referred to as SAE/LTE. It is desirable for mobile terminals to provide continuous service when moving within an SAE/LTE coverage area and between an SAE/LTE and a UMTS coverage area/2G coverage area.

Mobile telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (e.g. arithmetical mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Calculations to determine whether to perform a handover from one base station to another base station are performed by the network, whereas calculations whether to perform cell reselection are performed by the mobile terminal.

In the idle/inactive state the mobility state (i.e. fast moving or slow moving) of a mobile terminal can be used to optimise cell reselection parameters. Similarly, in the active state, the calculated mobility state can be used to optimise the handover parameters. In the idle/inactive state the mobility state is determined by the mobile terminal, whereas in the active communication state, the mobility state is calculated by the network. The cell reselection parameters and handover parameters can be set optimally by using a history of mobility state measurements.

SUMMARY OF THE INVENTION

According to the system described herein, a mobile telecommunications system includes a network core, at least one mobile terminal and a plurality of telecommunications nodes for providing radio resources to the mobile terminal when registered therewith, each node controlling a plurality of cells for communicating with the mobile terminal, wherein the mobile terminal is operable to change from registration with a first of said nodes to registration with a second of said nodes An information-providing device provides the second of said nodes with information indicative of interaction of the mobile terminal with the first node. The nodes may comprise an eNode B.

In a first embodiment, the first and second nodes each have a timer which expires after a time period from a triggering event, wherein the expiry of the node timer causes the node to notify the core network that the terminal has entered an idle communication state, wherein, when the node with which the mobile terminal is registered is changed from a first node to a second node after the triggering event but before expiry of the timer of the first node, an indication of the current timer value of the first node is provided to the second node, as said information indicative of interaction of the mobile terminal with the first node, and the time period after which the timer of the second node expires is modified in accordance therewith. The triggering event of the node timer is a pause in the transmission of data to or from the first node. An indication of the number of handovers since the triggering event may be provided to the second node. The second node may notify the core network that the terminal has entered the idle communication state or to adjust the frequency of cells favoured by the mobile terminal in dependence on the indication of the number of handovers.

The first embodiment, to be described in more detail below, provides a telecommunications network including a radio access network comprising a plurality of nodes (e.g. eNode Bs), a core network, and a plurality of telecommunications terminals for communicating with the core network via a selected one of the nodes, the selected one of said nodes being changed from time to time in accordance with a handover procedure, the nodes each having a timer which expires after a time period from a triggering event, wherein the expiry of the node timer causes the node to notify the core network that the terminal has entered an idle communication state, characterised in that when the selected one of the nodes is changed from a first node to a second node after the triggering event but before expiry of the timer of the first node, an indication of the timer value of the timer at the first node is provided to the second node and the time period after which the timer of the second node expires is modified in accordance therewith.

In a second embodiment, the information indicative of interaction of the mobile terminal with the first node comprises a history of movement of the mobile terminal within the network. The history is passed in response to movement of the mobile terminal from registration said first of the network nodes to registration with said second of said network nodes. The history is used to derive an indication of the rate of movement of the mobile terminal. This allows controlling handover of the mobile terminal from one of said cells to another of said cells in dependence on said indication of the rate of movement of the mobile terminal.

The second embodiment, to be described in more detail below, provides a mobile telecommunications system including at least one mobile terminal and a plurality of telecommunications nodes, each controlling a plurality of cells for communicating with the mobile terminals, characterised in that an element of the system is operable to store a history of movement of the mobile terminal within the network and to pass the history to one of said network nodes.

In a third embodiment, the information indicative of interaction of the mobile terminal with the first node comprises radio quality information relating to the mobile terminal. The radio quality information may include uplink carrier/interference, downlink carrier/interference and downlink quality of the second node. The radio quality information includes radio quality information for the radio link between at least one cell controlled by the first node and the mobile terminal.

The third embodiment, to be described in more detail below, provides a mobile telecommunications system including at least one mobile terminal and a plurality of telecommunications nodes for providing radio resources to the mobile terminal, each controlling a plurality of cells for communicating with the mobile terminals, wherein a first of said nodes is operable to handover the mobile terminal to a second of said nodes characterised in that the first of said nodes provides a second of said nodes with radio quality information relating to the mobile terminal.

BRIEF DESCRIPTION OF THE DRAWINGS

Embodiments of the system described herein will now be explained, by way of example, with reference to the accompanying drawings, in which.

In the drawings like elements are generally designated with the same reference sign.

DETAILED DESCRIPTION OF VARIOUS EMBODIMENTS

Figure 1:
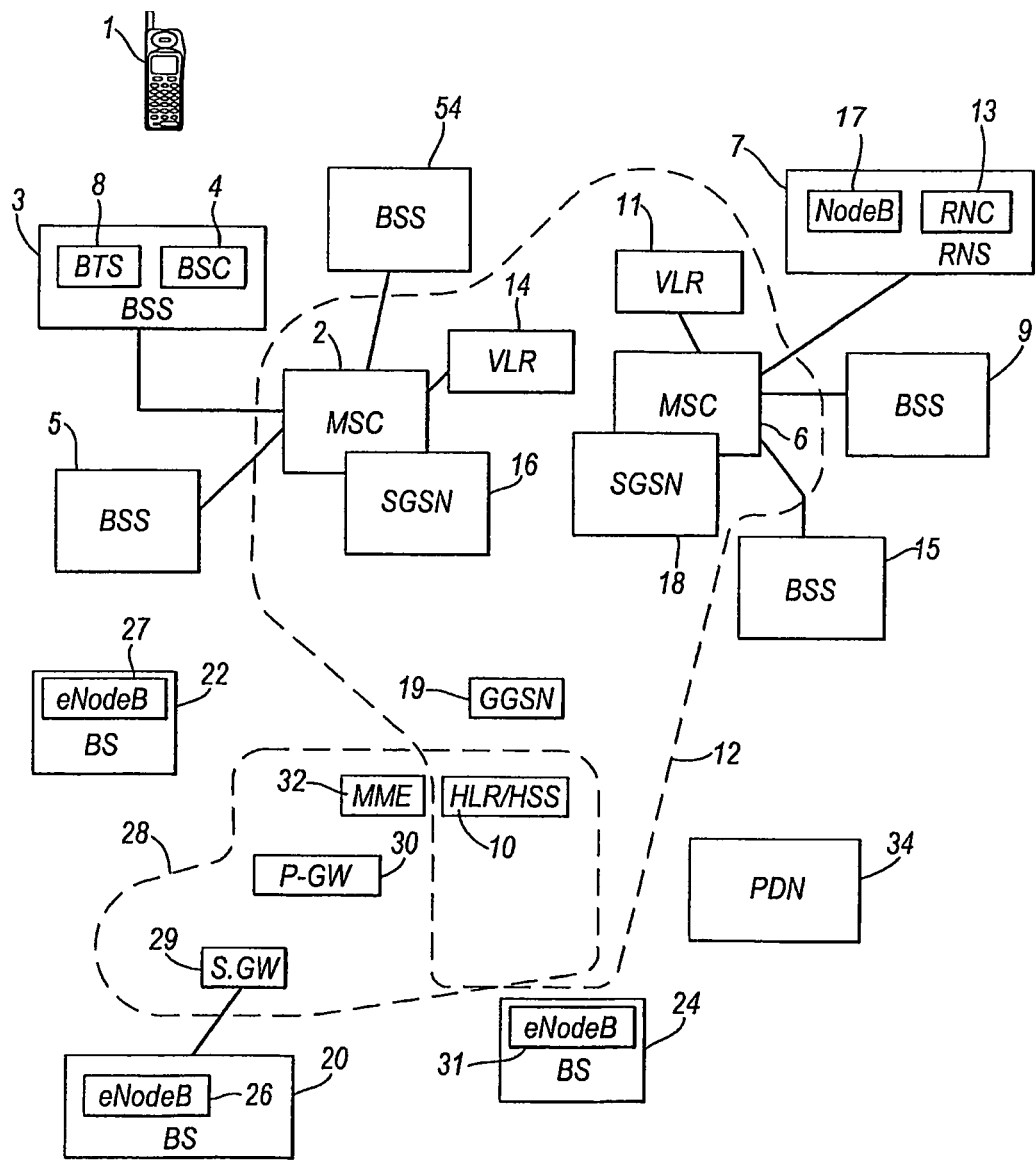
FIG. 1 is a diagrammatic drawing of certain elements of a mobile telecommunications system for use in explaining the operation of such a system and the embodiments of the system described herein.

Certain elements of a mobile telecommunications system, and its operation, will now briefly be described with reference to FIG. 1.

Each base station (BS) corresponds to a respective cell of its cellular or mobile telecommunications network and receives calls/data from and transmits calls/data to a mobile terminal in that cell by wireless radio communication in is one or both of the circuit switched or packet switched domains. Such a subscriber's mobile terminal (or User Equipment— UE) is shown at 1. The mobile terminal may be a handheld mobile telephone, a personal digital assistant (PDA), a laptop computer equipped with a datacard, or a laptop computer with an embedded chipset containing the mobile terminal's functionality.

In a GSM (2G) mobile telecommunications network, each base station subsystem (BSS) 3 comprises one or more base transceiver stations (BTS) 8 and a base station controller (BSC) 4. A BSC may control more than one BTS. The BTSs and BSCs comprise the GSM radio access network (RAN).

In a UMTS (3G) mobile telecommunications network, each Radio Network Subsystem (RNS) 7 comprises a Radio Network Controller (RNC) 13 and one or more base stations, called Node B's 17. An RNC may control more than one Node B 17. The Node B's and RNC's comprise the UMTS radio access network (RAN).

Conventionally, the base stations are arranged in groups and each group of base stations is controlled by one mobile switching centre (MSC), such as MSC 2 for base stations in BSSs 3, 54 and 5. As shown in FIG. 1, the network has another MSC 6, which is controlling a further two BSSs 9 and 15 and one RNS 7. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber, and also a unique key, Ki. The subscriber is issued with a publicly known number, that is, the subscriber's telephone number, by means of which calls to the subscriber are initiated by callers. This number is the MSISDN.

The network includes a home location register (HLR)/ home subscriber server (HSS) 10 which, for each subscriber to the network, stores the IMSI and the corresponding MSISDN together with other subscriber data, such as the current or last known MSC of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers. As well as the basic HLR/authentication functions, the HSS may be enhanced through the use of additional databases and reference points. This enables the network to offer the subscriber advanced services and features by interfacing with service application servers based on CAMEL, OSA (Open Service Access) and SIP.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the BTS 8 associated with the particular cell in which the terminal 1 is located. In a traditional network, the BTS 8 then transmits this IMSI to the MSC 2 with which the BSS 3 is associated. In a network using the functionality described in 3GPP TS 23.236, the BSS follows prescribed rules to select which MSC to use, and then transmits this IMSI to the selected MSC.

MSC 2 now accesses the appropriate HLR/HSS 10 and extracts the corresponding subscriber MSISDN and other subscriber data from the appropriate storage location, and stores it temporarily in a location in a visitor location register (VLR) 14. In this way, therefore the particular subscriber is is effectively registered with a particular MSC (MSC 2), and the subscriber's information is temporarily stored in the VLR (VLR 14) associated with that MSC. The information stored on the VLR 14 includes a Temporary Mobile Subscriber Identification (TMSI) number for identification purposes for the terminal within the MSC 2. The TMSI number is an identification number that is typically 32 bits in length. In conventional systems, therefore, the TMSI number is not allocated to more than one user of a given system served by that MSC at one time. Consequently, the TMSI number is usually invalidated when the mobile station crosses into a new location served by a different MSC.

When the HLR 10 is interrogated by the MSC 2 in the manner described above, the HLR 10 additionally causes an authentication procedure to be performed on the mobile terminal 1. The HLR 10 transmits an authentication request comprising the subscriber identity (IMSI) to an AUC (authentication centre) for deriving authentication vectors (AVs). Based on the IMSI, the AUC generates a challenge, which is a random number, or obtains a stored challenge based on the IMSI, Also, the AUC generates an XRES (expected result), based on the challenge and a secret shared with the SIM, or obtains an XRES stored with the challenge. The XRES is used to finalise the authentication. In a UMTS network, the AUC also generates an IK (integrity key) based on the shared secret and the challenge, which can be stored together with the XRES and the authentication data at the AUC and used for integrity checking messages sent between the mobile terminal 1 and the RNC.

The authentication data, XRES and CK/IK, are then transmitted to the MSC 2, which transmits the authentication challenge to the mobile telephone 1. The to mobile telephone 1 generates a response by transmitting the authentication data to the SIM/USIM of the mobile telephone 1. The SIM/USIM generates, based on the Ki of the subscription stored on the SIM/USIM and the authentication challenge, a response corresponding to the XRES stored in the server.

For finalising the authentication according to SIM/USIM authentication the MSC 2 compares the response value with the value of the stored XRES for authentication control.

If the response from the mobile terminal 1 is as expected, the mobile terminal 1 is deemed authenticated. At this point the MSC 2 requests subscription data from the HLR 10. The HLR 10 then passes the subscription data to the VLR 14.

As part of the authentication process a cipher key CK for encrypting user and signalling data on the radio path is also established. This procedure is called cipher key setting. The key is computed by the mobile terminal 1 using a one way function under control of the key Ki and is pre-computed for the network by the AUC. Thus at the end of a successful authentication exchange both parties possess a fresh cipher key CK.

The authentication process will be repeated while the mobile terminal 1 remains activated and can also be repeated each time the mobile terminal makes or receives a call, if required.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the BSS 3 and passed on to the MSC 2. The MSC 2 routes the calls towards the called party via the MSC 2. By means of the information held in the VLR 14, MSC 2 can associate the call with a particular subscriber and thus record information for charging purposes.

As described in the 3GPP Release 4 set of Specifications, the MSC 2 can be split into an MSC-Server (MSC-S) and Media GateWay (MGW).

The MSCs 2 and 6 support communications in the circuit switched (CS) domain—typically voice calls. Corresponding SGSNs 16 and 18 are provided to support communications in the packet switched (PS) domain—such as GPRS data transmissions. The SGSNs 16 and 18 function in an analogous way to the MSCs 2 and 6. The SGSNs 16, 18 are equipped with an equivalent to the VLR for the packet switched domain. GGSN 19 provides IP connectivity to the internet and/or private intranets.

When mobile terminal 1 attaches to the network, the SGSN 16 checks data transmitted from the SIM with data retrieved from the HLR/HSS 10 in order to authenticate the mobile terminal, in the manner described above in relation to the MSC 2. The transmission of PS data is then authorised by using the Access Point Name (APN) to help select a GGSN and activating a PDP context. The SGSN may provide the APN to a DNS server, and the DNS server may then return a list of GGSNs. The SGSN 16 sends a request for a PDP context to the GGSN 19. The GGSN 19, or an associated server, provides an appropriate IP address to the mobile terminal 1.

Elements of an LTE network are shown in FIG. 1. The base stations 20,22 and 24 comprise an eNodeB (evolved Node B) 26,27,31. The RRC signalling with the mobile terminal 1 terminates at the eNodeB 26,27,31. The eNode Bs form the RAN of the LTE network. The eNodeB performs the functions of both the Node B and a large part of the RNC of the 3G/UMTS network. The network core 28 of the LTE network includes Serving Gateway (S-GW) 29, PDN Gateway (P-GW) 30, the HLR/HSS 10 (a common HLR/HSS shared with the network core 12 of the GSM/UMTS network) and also Mobility Management Entity (MME) 32. The S-GW 29 and MME 32 perform functions similar to those of the UMTS MSC and VLR. The SAE/LTE network authenticates a user's SIM in a manner corresponding to that described above for a UMTS network.

Although shown separately in FIG. 1, the P-GW 30 and GGSN 19 may be combined to form a single element.

Both the GSM/UMTS and LTE networks can communicate with an external packet data network PDN 34.

From the description above, it will be understood that the coverage area of a mobile telecommunications network is divided into a plurality of cells, each of which is served by a respective base station.

As mentioned above, a mobile terminal has an active mode and an idle/inactive mode. In the idle/inactive mode a mobile terminal "camps" on what is determined to be the best cell. As the mobile terminal moves around, the best cell changes and cell reselection is performed by the mobile terminal to change the cell on which the mobile terminal is camped. In UMTS, in the idle mode, the mobile terminal controls its own mobility independently and starts a cell switch (reselection) when a neighbouring cell has a better quality than the current cell, as described in 3GPP TS 25.304. Information from the neighbouring cells is broadcast in the system information block 11 (SIB11) or system information block 12 (SIB12) of the broadcast channel (BCH) as described in 3GPP TS 25.304 and 3GPP TS 25.331. A similar procedure is also used in GSM/GPRS mobile networks, as described in technical specification 3GPP TS 05.08 (UE-based cell reselection). LTE/SAE also has a similar reselection procedure.

In the active mode, in order to allow a mobile terminal to maintain a call when the mobile terminal moves outside the coverage area of a cell, the call must be switched to an alternative cell automatically. This process is referred to as "handover". Handover is a time critical process requiring action to be taken before the radio link with the original cell degrades to such an extent that the call is lost. Handover requires synchronisation of events between the mobile terminal and the network.

Network-driven handover in UMTS is performed when necessary, as described in 3GPP TS 25.331. In this state a mobile terminal scans the pilot channels of up to 32 intra-frequency cells neighbouring its current cell. The mobile terminal forms a list of the best cells for possible handover based on the received signal strength and/or quality (i.e. the error rate in the received signal). The information in this list is passed to the UTRAN RNC 13 on an event-driven basis, e.g. when the signal strength or signal-to-noise ratio of one of the cells exceeds a threshold. The information list is used by a handover algorithm implemented in the UTRAN RNC 13. The algorithm that determines when handover occurs is not specified in the GSM or UMTS Standards. The algorithms essentially trigger a handover when the mobile terminal 1 provides a measurement of a neighbour cell received signal at the mobile terminal 1 above a predetermined quality received threshold, which typically has a relation to the quality of the received signal from the serving cell (e.g. better quality by some margin). LTE/SAE performs a similar handover procedure, with the eNodeB implementing the handover algorithm.

When a calling party (whether a subscriber within the mobile telecommunications network or outside it) attempts to call a mobile terminal within the network that is in the idle state, that mobile terminal must be paged. Paging is a process of broadcasting a message which alerts a specific mobile terminal to take some action—in this example, to contact the network and, after the exchange of some signalling, notify the terminal that there is an incoming call to be received.

The frequency with which a mobile terminal checks to determine whether any paging messages are transmitted by the network is the "DRX Cycle Length". The DRX Cycle Length value is transmitted by the network to the mobile terminal. The DRX Cycle Length is intended to reduce the terminal battery consumption, and thus operators would normally set this as long as possible whilst considering paging message delay.

If the network knows in which cell the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur; the more use of valuable signalling capacity within the network.

However, if the MSC is to always have an up-to-date record of the cell in which each mobile terminal is located so that the current cell which is occupied by a terminal is always known, this will require a large amount of location updating signalling between the mobile terminal and the MSC in order that the MSC has up-to-date records of the cells occupied by each mobile terminal. This is also wasteful of valuable signalling capacity.

As indicated above, the HLR is updated each time a mobile terminal moves from the coverage area of one MSC to another MSC and from one SGSN to another SGSN. However, typically the area covered by a single MSC and SGSN is large, and to page all the cells covered by a single MSC and SGSN Would require a significant amount of paging signalling.

The problems of excessive use of signalling capacity by paging a multiplicity of cells or performing a multiplicity of frequent location updates is solved in a known manner in 2G and 3G networks by dividing the coverage area of the mobile telecommunications network into a plurality of location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area (LAI). The mobile terminal uses this data to determine when it has moved into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location area update (LAU). The request includes the now out-of-date LAI and the terminal's current TMSI. If the MSC/VLR is the same for the new and old location areas, the network can immediately authenticate the mobile terminal and note the change of location area. However, if the mobile terminal is moved to a different MSC/VLR, the MSC/VLR addresses a message to the HSS/HLR. The HSS/HLR notes the new location and downloads security parameters to allow the network to authenticate the mobile. It also passes on subscription details of the user to the new VLR and informs the old VLR to delete its records. The new MSC/VLR allocates a new TMSI to the mobile.

A routing area relates to a particular geographical area for communications in the packet-switched domain. Typically, although not necessarily, a routing area is larger than the area of a single cell but is smaller than the area covered by one SGSN. A routing area is typically, although not necessarily, smaller than a location area. There may be many routing areas within one location area. Each cell within the network broadcasts data indicative of its routing area (RAI) in addition to the data mentioned above indicative of the identity of its location area. The mobile terminal uses this received data to determine when it has moved to a new routing area. The terminal stores the last known routing area on its SIM. The information stored on the SIM is compared with the routing area information broadcast by the local cell. The identities of the two routing areas are compared. If they are different, the mobile terminal determines that it has entered a new routing area. The mobile terminal then gains access to a radio channel and requests a routing area update (RAU). The routing area is updated in the same manner as the location area, as discussed above.

In addition to the LAU and RAU performed in the manner described above—as a result of movement of the mobile terminal or signal fade—the network also instructs each mobile terminal to periodically (at regular intervals) report its location (its LA or RA) to the network by the mobile terminal performing a Periodic Location/Routing Area Update (PLAU or PRAU). The network provides each mobile terminal registered therewith an instruction, indicating the frequency with which PLAUs/PRAUs should be performed. Typically all mobile terminals registered with a network will be instructed to perform such updates at the same frequency—for example, every 60 minutes. A PLAU/PRAU timer starts counting when the mobile terminal enters the idle state. If the active state is entered the timer is re-set, and begins counting again from its initial value when the idle state is entered again. Thus, a PLAU/PRAU is only performed if the mobile terminal is idle for more than 60 minutes (in to this example).

The primary purpose of the PLAU or PRAU sent by the mobile terminal is to provide the network with an indication that the mobile terminal is still registered and active. During these procedures, the Radio Access network provides the current serving cell's identity to the MSC and/or SGSN. If the network does not receive a PLAU or PRAU then, after a first extra timer expires, it need not page the mobile, and after, typically, a much larger time passes, it may purge the mobile terminal's subscription information from the VLR.

As discussed above, GSM and UMTS mobile telecommunications networks are divided into location areas/routing areas. The LTE network has the equivalent of location/routing areas (herein "tracking areas", TAs). Tracking area (including periodic TA updates, PTAUs) updates are performed in a broadly similar manner to LAUs and RAUs. These Tracking area updates are performed with the MME 32. An additional Periodic Session Management Update may be performed by the terminal with the P-GW 30. A decision in this regard has not yet been made by the relevant Standards bodies.

The size and position of the tracking areas may be different from the size and area of the LAs and RAs.

Many mobile network systems in accordance with the UMTS standard are designed such that they use several frequencies and the development of the cells occurs in small cells ("micro-cells") and larger cells ("macro-cells"). In general, this type of arrangement is called "hierarchical cell structure" (HCS) in cellular networks. This arrangement is described in 3GPP TS 25.304.

In HCS slow-moving or stationary mobile terminals should be located in the smallest possible cells, such as micro-cells, while (faster) moving mobile terminals are preferably located in larger cells, such as macro-cells. This reduces the number of cell switches for faster moving mobile terminals. In order to identify whether a mobile terminal is moving or stationary, HCS uses the determination of the number of cell changes (parameter NCR) over a specified period of time (parameter TCR) as described, for example, in WO-A-2001043462.

Both parameters NCR and TCR are reported to the mobile terminal via the BCH (in SIB3 or 4) in each cell and the mobile terminal decides using the number of cell changes (NCR) in time period (TCR) whether it is in a so-called "low-mobility" or "high-mobility" state. If the mobile terminal is in a "low-mobility" state, it favours a cell change in smaller cells (micro-cells) and in a "high-mobility" state, it favours larger cells (macro-cells). The result of this behaviour is that the number of cell changes for fast-moving mobile end devices is minimised, whereby the capacity of the mobile network is maximised overall.

In non-HCS networks there are also mechanisms to determine the mobility state of a mobile terminal. For example, again, the number of cell changes (NCR) over a specified period of time (TCR) can be used, or the degradation of received pilot channel power within a given time period being above a threshold can be used. Other methods are also possible.

A switch from the current cell to a neighbouring cell generally takes place when a neighbouring cell is technically better than the current cell. It is thus ensured that a mobile terminal is generally located in the cell of a mobile network in which it needs the lowest possible transmitting power in order to contact the closest base station and/or has the best reception conditions.

In order to avoid a cell switch based on short-term changes in the radio field conditions, so-called "fading", and the subsequent return to the original cell, a to UMTS system mainly uses two parameters that are emitted in the Broadcast Channel (BCH) in the system information block 3 (SIB3) or system information block 4 (SIB4). Notably, these are the time interval "Treselection" and the hysteresis value "Qhyst". In order to avoid too fast a switch between cells based on quickly changing network conditions, a switch from the original cell to the neighbouring cell only takes place if the neighbouring cell was better than the original cell by the factor "Qhyst" for the time "Treselection". This behaviour of a mobile end device is described in detail on the technical specification 3GPP TS 25.304. Multiple frequency layers and mobility state determination are provided in a similar manner for LTE/SAE networks.

In LTE/SAE Radio Resource Management (RRM) is performed by the eNode B. The following embodiments of the invention provide RRM optimisation based on information provided by other network nodes.

A first embodiment preserves connected state information at handover.

When there is a pause in data flow between the mobile terminal 1 and eNodeB 26 of a particular duration, it is desirable for the LTE idle state to be entered.

Both the mobile terminal 1 and the eNodeB 26 include a timer. These timers begin counting when data flow between the mobile terminal 1 and the eNodeB 26 pauses. When the timer of the mobile terminal 1 reaches a predetermined value, the mobile terminal 1 enters the LTE idle mode. When the timer of the eNodeB 26 reaches a predetermined value, the eNodeB 26 records that mobile terminal 1 has entered the LTE idle mode. The period between each of the timers beginning counting (from zero) and reaching their respective predetermined value is the timer duration. When the eNodeB 26 timer reaches its predetermined value it causes a signalling message to be passed to the MME 32 which informs the MME 32 that the network shall regard mobile terminal 1 as being in the LTE idle mode. The MME 32 then advises the S-GW or each P-GW 30 that the mobile terminal 1 is in the LTE idle mode.

The mobile terminals maintained in RRC Connected state for some time after the last data transfer. This is to ensure that there is not unnecessary paging load in the network, introduced by the downlink data being delivered into the system after the mobile terminal has returned to idle state. When the mobile terminal is in idle state the location of the mobile terminal is only known on a tracking area basis, and therefore the network will need to page the mobile terminal in all cells across the tracking area to find the mobile terminal.

In LTE, as the RRC/RRM function has been moved down to the eNodeB 26, the number of cells which the node controls is likely to be much smaller than with GSM or UMTS (an RNC typically controls hundreds of cells). Also when a mobile terminal is moved onto a cell controlled by a different eNodeB, unlike UMTS the control of the RR also moves to this different eNodeB. With these two factors in mind, the probability that the mobile terminal is changing eNodeB when changing cell is quite high.

The eNodeB 26 controls whether the mobile terminal should remain in Connected state by calculating the time since last data transfer. At eNodeB 26 the mobile terminal 1 eventually either gets handed over to another eNodeB or pushed to idle state. When the mobile terminal 1 is handed over to another eNodeB 27, in accordance with this embodiment of the invention, the new eNodeB 27 is provided with an indication of how long since data transfer has been performed with the mobile terminal 1. The amount of time (time "y") since the last data transfer is passed between the eNodeBs 26,27 in the handover signalling.

The timer of the new eNodeB 27 may then start counting from time "y", rather than from time zero. If the time reaches its predetermined value, the LTE idle node is then recorded for the mobile terminal and appropriate signalling to the MME 32 is performed. If handover to a further eNodeB 31 occurs before the time reaches its predetermined value, the current value of the timer ("z") is passed to the further eNodeB 31. The timer of the further eNodeB 31 then starts counting from time "z", and so on.

This avoids the mobile terminal 1 being prematurely released from the active state and avoids the mobile terminal being maintained in the active state unnecessarily.

To avoid the mobile terminal from performing too many handovers and causing excessive network signalling load, the number of handovers since last data transfer may also be provided in the handover signalling, such that an intelligent decision for the release of the mobile terminal from RRC Connected state can be made. The new eNodeB can then determine if a large number ("n") of handovers has occurred since the pause in data flow. When the number of handovers reaches "n", the new eNodeB, instead of handing over to another eNodeB, enters the mobile terminal into the idle state.

Alternatively, the information regarding the number of handovers can be used as a basis to select the frequency layer/size of cell used by the mobile terminal (e.g. macro-layer or micro-layer).

When subsequently downlink data from the PDN 34 is received by the P-GW 30 for transmission to the mobile terminal 1, the P-GW 30 is aware that the mobile terminal 1 is in the LTE idle state as a result of the signalling from the MME 32 to the P-GW 30 mentioned above. The P-GW 30 buffers the downlink data packet. The P-GW 30 then issues a request for the MME 32 to page the mobile terminal 1. The MME 32 requests all eNode Bs in the tracking area to page the mobile terminal 1. (The MME 32 maintains a record of the tracking area occupied by each mobile terminal 1.) Over the next discontinuous reception (DRX) period, all the eNodeBs in the tracking area to attempt to page the mobile terminal 1. The mobile terminal 1 responds to the eNodeB on which it is camped and the active communication state can then be entered.

A second embodiment of the inventions improves frequency layer selection.

As mentioned above, currently in GSM and UMTS, the radio controlling nodes (RNC/BSC) control a large number of cells. An RNC typically controls hundreds of cells. As it controls a large number of cells, the RNC uses some trend analysis (historical movement data) to understand how fast the mobile terminal is moving, across the cells. In SAE/LTE the radio controlling nodes (eNode Bs) are smaller in size—i.e. they serve fewer cells and/or cover a smaller geographical area. When the radio eNode B controlling nodes are decreased in size the history stored by the eNode B will be significantly shorter because a mobile terminal will be registered with cells controlled by the eNode B for less time. Historical information is available to the RRM algorithm of the controlling node (eNode B) is therefore reduced.

Advantageously, in this embodiment, when the eNode B 26 serving the mobile terminal changes to new eNodeB 27, the new eNodeB 27 is informed of some historical information for the mobile terminal gathered by the old eNode B 26, such that future RRM decisions by the new eNode B 27 can be based on more accurate/stable information.

In the handover signalling it is also possible to include a list of the last x cells which have controlled the mobile terminal and the hold time of the mobile terminal on each cell. In this way the RRM algorithm in the new eNodeB 27 can more intelligently trigger future handover.

As the eNodeBs are devices which are controlling a small number of cells, if to the eNode B does not have some memory of the mobile terminal historical movements, it would not know whether a mobile terminal is a fast moving mobile terminal and should be moved to the macro layer, or a slow moving mobile terminal and therefore be maintained on the micro layer.

The mobile terminals in idle mode could be required to store information on the last cells and the hold time in these cells, providing this to the network when performing a tracking area update. The network can use this information to provide the mobile terminal with mobile terminal specific reselection parameters to place the mobile terminal on a different frequency layer.

The second embodiment will now be described in more detail. In the active state, knowledge of whether the mobile terminal is fast-moving or not can enable the network to set the handover settings appropriately when the mobile terminal is in an active state, to allow good handover performance.

From the preceding discussions, it should be clear that mobility is controlled differently in the active and inactive states. In the active state handover between cells is (primarily) controlled by the network. In the inactive/idle state cell reselection is (primarily) controlled by the mobile terminal. However, in both states a determination of the mobility state may be made, e.g. whether the mobile terminal is "fast moving" or "slow moving".

It will now be described what happens when a mobile terminal moves from being served by a first eNode B 26 to a second eNode B 27. According to this embodiment, the mobile terminal when it registers with eNode B 27 initially maintains in the "mobility state" that it had when it was registered with eNode B 26 (e.g. "fast moving" or "slow moving"). In this way the mobile terminal does not have to re-start its "mobility" context when it changes eNode B. The "mobility state" from eNode B 26 is initially used in eNode B 27 but can be subsequently changed in accordance with mobility calculations made while the mobile terminal is served by eNode B 27.

Figure 2:
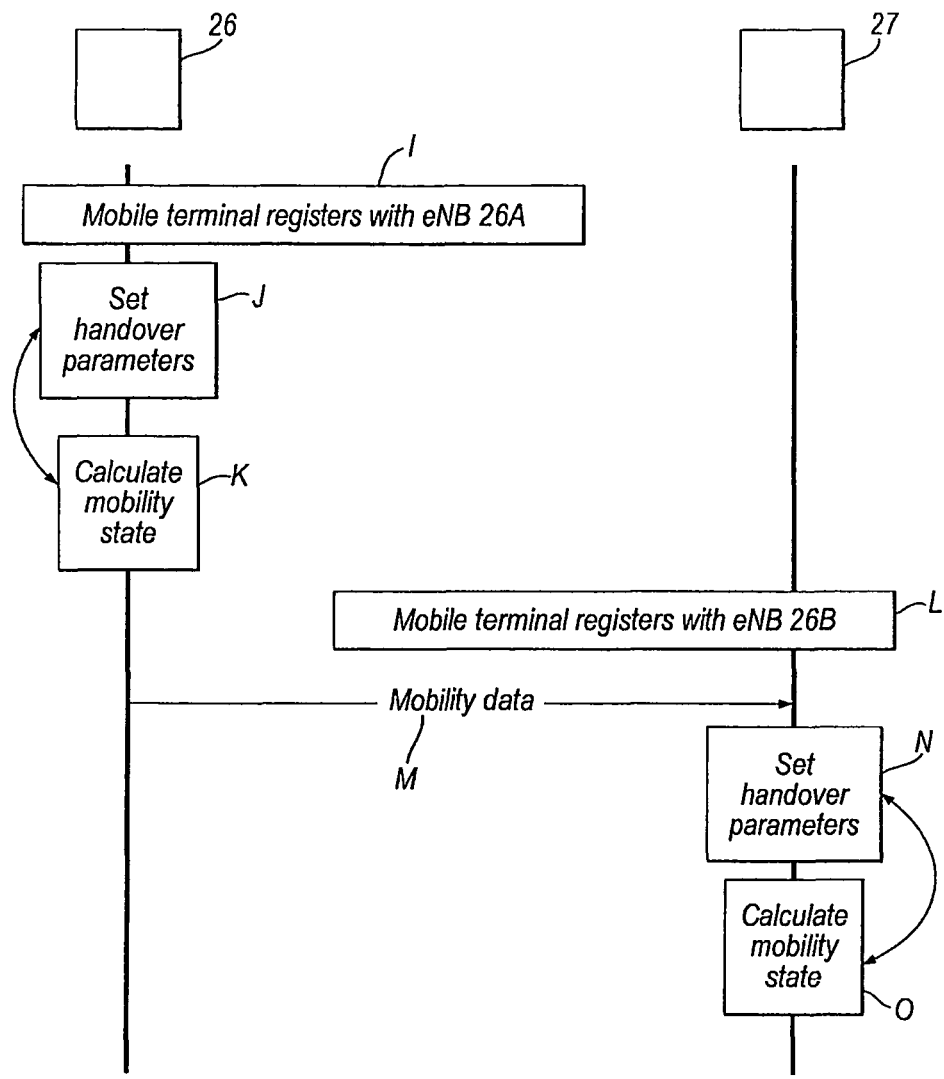
FIG. 2 shows the transfer of mobility data from a first node to a second node in accordance with a second embodiment of the system described herein.

In FIG. 2 at step I the mobile terminal registers with eNode B 26. At step J the handover parameters are set, and at step K the mobility state is calculated, in the manner described above. Steps J and K are performed repeatedly in a loop in order that the handover parameters are optimised as the mobility state of the mobile terminal 1 varies.

At step L the mobile terminal registers with eNode B 27. In accordance with this embodiment of the invention at step M active mode mobility state data is transmitted from eNode B 26 to the eNode B 27. In addition to an indication of whether the mobile terminal is fast or slow moving, the mobility state data may also include historical movement data—such as a list of the last x cells which have controlled the mobile terminal and the hold time on each cell.

At step N the eNode B 27 sets cell handover parameters. In accordance with this embodiment the handover parameters use the active mode mobility state data provided at step M when the mobile terminal 1 initially registers with the eNode B 27. This allows the handover parameters to be optimised at this initial stage before sufficient mobility state calculations have been performed at step O. Steps N and O are performed in a loop repeatedly in order that the handover parameters can be optimised as the mobility state changes.

Figure 3:
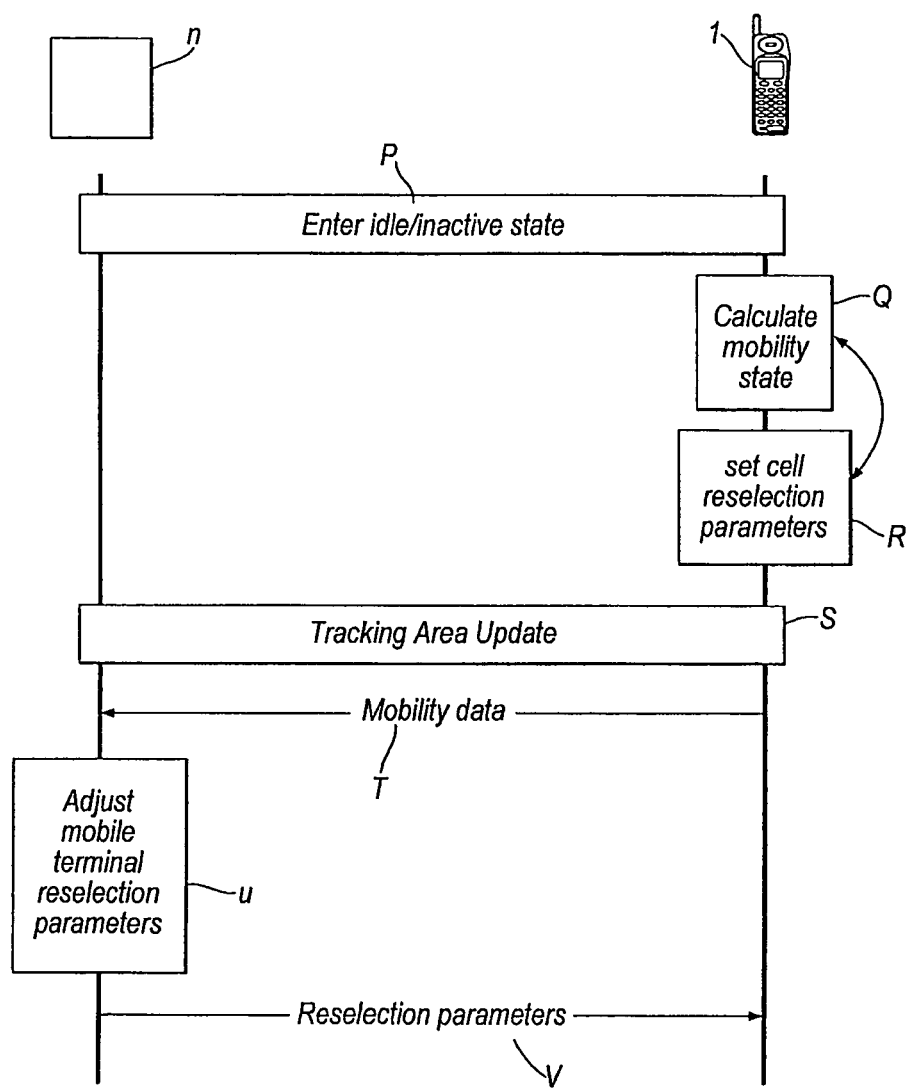
FIG. 3 shows transfer of mobility data from a mobile terminal to the network core in accordance with the second embodiment of the system described herein.

FIG. 3 shows the steps taken by the network and the mobile terminal 1 in the idle/inactive state. At step P the mobile terminal 1 enters the idle/inactive state. For example, this may occur after a predetermined period of inactivity. In the inactive state the mobile terminal 1 calculates at step Q its mobility state in the manner described above. The mobile terminal then sets the cell reselection parameters at step R in accordance with the mobility state calculated at step Q. Steps Q and R are periodically repeated in a loop so that the cell reselection parameters are frequently adjusted in accordance with the periodically calculated mobility state, in the manner described above.

At step S a tracking area update is performed. In accordance with this embodiment of the invention, the idle/inactive mode mobility state data determines at step Q is transmitted from the mobile terminal 1 to the network n at step T. The network n includes a receiver/processor to receive and process the idle/inactive mode mobility state data and to use this to subsequently provide the mobile terminal 1 with mobile terminal specific reselection parameters—for example to adjust the DRX cycle length/CMCL and/or to change the frequency layer—step V.

A third embodiment provides for handover "ping-pong" avoidance.

As mentioned above, in UMTS the RNC performs Radio Resource Management/mobility management, and typically controls hundreds of cells. The handover algorithm in the RNC typically performs a multiplicity of handovers for a mobile terminal. Therefore, when making a handover decision, the RNC will usually have available information used to make previous handover decisions. This allows the handover decision to be made more intelligently. For example, to prevent the mobile terminal being handed back to a cell from which it was recently handed over when the quality of the link with the current cell is reduced for only a brief period—so-called handover "ping-pong".

In LTE/SAE, because RRM is performed by the eNodeB, which serves far fewer cells than a UMTS RNC, there is a likelihood that an eNodeB making a handover decision will not have previously performed handover data for the mobile terminal, and therefore will conventionally be susceptible to "ping-pong". This problem is exacerbated by eNodeBs in the same network possibly using different RRM algorithms—so the handover criteria used by one eNodeB may be different to the handover criteria used for another eNode B.

In accordance with this embodiment of the invention, when the controlling eNodeB for a mobile terminal is changed from a first eNode B to a second eNode B, the first eNode B passes information used to make previous handover decision(s) for the mobile terminal to the second eNode B. Conventionally, no information about radio quality is passed between eNode Bs or UMTS RNCs. Whilst this does not cause significant disadvantages for UMTS networks, it is disadvantageous for LTE/SAE networks.

Referring to FIG. 1, in this embodiment when the handover preparation procedure is triggered by an eNodeB 26, the eNodeB 26 includes the triggering condition in the handover messaging to the core network 28. The eNodeB 26 may calculate a density function (C) for the signal strength of its traffic and a density function (I) for the signal strength of traffic in the direction of another base station. From these density functions, a density function for C/I can then be formed.

The following information could be included in the messaging from the eNode B 26 to the core network 28.
Uplink C/I
Downlink C/I
Downlink quality of target cell
Some indication of long term trend The target eNode B 27 receives this information from the core network 28 and can use this information as an input into its handover algorithm to ensure that the eNodeB 27 does not trigger the handover of the mobile terminal to the returning to the original cell.

Alternatively, the mobile terminals could be required to store information on the last cells and the hold time in these cells, providing this to its eNode B when arriving on the new cell, where it can be stored by the eNodeB for use in handover decision.

A fourth embodiment of the invention will now be described with reference to FIG. 1.

In a known manner, when the mobile terminal 1 performs a tracking area update, this is recorded by the MME 32. Also in the known manner, when the mobile terminal 1 moves from the idle state to the active state, and vice versa, this is recorded by the MME 32. Further, in the known way, when the mobile terminal 1 is in the active state, the number of handovers occurring over a given period of time is recorded by the MME 32.

According to the embodiment, when the mobile terminal 1 moves from the idle state to the active state, and registers with the appropriate eNode B 26, the MME 32 then provides the mobility data previously collected for the mobile terminal 1 to the eNode B 26 for use in mobility management whilst the mobile terminal 1 is connected. The information passed by the MME 32 to the eNode B 26 may be information regarding the number of tracking area updates over a period of time, the number of idle to active state transitions over a period of time, the number of handovers over a given period of time, etc. This may allow the eNode B 26 to instruct the mobile terminal 1 to set optimal Measurement-Control parameters in dependence upon the determined mobility status of the mobile terminal 1 and/or allow the eNodeB 26 to manipulate the duration which the mobile terminal 1 is maintained in connected state and/or to adjust the handover algorithm in accordance with the mobility status. If the eNode B 26 determines that the mobile terminal has a high mobility, the eNode B 26 may instruct the mobile terminal to favour a cell change to larger cells (macro-cells), whereas if it is determined that the mobile terminal is in a low to mobility state, the mobile terminal may favour a cell change to smaller cells (micro-cells).

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:
1. A mobile telecommunications system, comprising:
a network core;
at least one mobile terminal;
a plurality of telecommunications nodes for providing radio resources to the mobile terminal when registered therewith, each node controlling a plurality of cells for communicating with the mobile terminal, wherein the mobile terminal is operable to change from registration with a first of said nodes to registration with a second of said nodes; and
an information-providing device that provides the second of said nodes with information indicative of interaction of the mobile terminal with the first node, wherein the first and second nodes each have a timer which expires after a time period from a triggering event, wherein the expiry of the node timer causes the node to notify the core network that the terminal has entered an idle communication state, wherein, when the node with which the mobile terminal is registered is changed from a first node to a second node after the triggering event but before expiry of the timer of the first node, an indication of the current timer value of the first node is provided to the second node, as said information indicative of interaction of the mobile terminal with the first node, and the time period after which the timer of the second node expires is modified in accordance therewith.

2. The system of claim 1, wherein the triggering event of the node timer is a pause in the transmission of data to or from the first node.

3. The system of claim 1, wherein an indication of the number of handovers since the triggering event is provided to the second node.

4. The system of claim 3, wherein the second node is operable to notify the core network that the terminal has entered the idle communication state or to adjust the frequency of cells favoured by the mobile terminal in dependence on the indication of the number of handovers.

5. The system of claim 1, wherein said information indicative of interaction of the mobile terminal with the first node comprises a history of movement of the mobile terminal within the network.

6. The system of claim 5, wherein said history is passed in response to movement of the mobile terminal from registration said first of the network nodes to registration with said second of said network nodes.

7. A mobile telecommunications system, comprising:
a network core;
at least one mobile terminal;
a plurality of telecommunications nodes for providing radio resources to the mobile terminal when registered therewith, each node controlling a plurality of cells for communicating with the mobile terminal, wherein the mobile terminal is operable to change from registration with a first of said nodes to registration with a second of said nodes; and
an information-providing device that provides the second of said nodes with information indicative of interaction of the mobile terminal with the first node, wherein said information indicative of interaction of the mobile terminal with the first node comprises a history of movement of the mobile terminal within the network, and wherein said history is used to derive an indication of the rate of movement of the mobile terminal.

8. The system of claim 7, further comprising:
a controller that controls handover of the mobile terminal from one of said cells to another of said cells in dependence on said indication of the rate of movement of the mobile terminal.

9. The system of claim 7, wherein said information indicative of interaction of the mobile terminal with the first node comprises radio quality information relating to the mobile terminal.

10. The system of claim 9, wherein the radio quality information includes radio quality information for the radio link between at least one cell controlled by the first node and the mobile terminal.

11. A mobile telecommunications system, comprising:
a network core;
at least one mobile terminal;
a plurality of telecommunications nodes for providing radio resources to the mobile terminal when registered therewith each node controlling a plurality of cells for communicating with the mobile terminal, wherein the mobile terminal is operable to change from registration with a first of said nodes to registration with a second of said nodes; and
an information-providing device that provides the second of said nodes with information indicative of interaction of the mobile terminal with the first node, wherein said information indicative of interaction of the mobile terminal with the first node comprises radio quality information relating to the mobile terminal, and wherein the radio quality information includes at least one of: (i) uplink carrier/interference, (ii) downlink carrier/interference or (iii) downlink quality of the second node.

12. A mobile telecommunications system, comprising:
at least one mobile terminal; and
a plurality of telecommunications nodes, each controlling a plurality of cells for communicating with the mobile terminal, wherein an element of the system is operable to store a history of interactions of the mobile terminal with the network and to pass the history to one of said network nodes, wherein said history is used to derive an indication of the rate of movement of the mobile terminal.

13. The system of claim 12, further comprising:
a controller that controls handover of the mobile terminal from one of said cells to another of said cells in dependence on said indication.

14. The system of claim 12, wherein the element comprises another of said network nodes.

15. The system of claim 14, wherein said history is passed in response to movement of the mobile terminal from registration with said another of said network nodes to registration with said one of said network nodes.

16. A mobile telecommunications system, comprising:
at least one mobile terminal; and
a plurality of telecommunications nodes, each controlling a plurality of cells for communicating with the mobile terminal, wherein an element of the system is operable to store a history of interactions of the mobile terminal with the network and to pass the history to one of said network nodes, wherein the element is the mobile terminal, and wherein said history is passed in response to movement of the mobile terminal from one tracking area to another tracking area.

17. The system of claim 16, wherein said history is used to adjust the cell reselection parameters used by the mobile terminal.

18. The system of claim 16, wherein the element is a Mobility Management Entity.

19. A mobile telecommunications system, comprising:
at least one mobile terminal; and
a plurality of telecommunications nodes, each controlling a plurality of cells for communicating with the mobile terminal, wherein an element of the system is operable to store a history of interactions of the mobile terminal with the network and to pass the history to one of said network nodes, and wherein the history is passed in response to a change of the mobile terminal from an idle communication state to an active communication state.

20. The system of claim 19, wherein the history includes data indicative of at least one of: (i) past tracking area updates, (ii) past idle to active communication state transitions, and or (iii) past handovers of the mobile terminal.

* * * * *